United States Patent [19]

Sato

[11] 4,066,741
[45] Jan. 3, 1978

[54] PROCESS FOR THE PRODUCTION OF HYDROGEN BY THE THERMAL DECOMPOSITION OF WATER

[75] Inventor: Shoichi Sato, Mito, Japan

[73] Assignee: Japan Atomic Energy Research Institute, Tokyo, Japan

[21] Appl. No.: 628,930

[22] Filed: Nov. 5, 1975

[30] Foreign Application Priority Data

Nov. 8, 1974  Japan .................................. 49-128652

[51] Int. Cl.$^2$ ........................ C01B 1/02; C01B 2/06; C01B 1/08; C01B 13/00
[52] U.S. Cl. .................................. 423/658; 423/437; 423/481; 423/493; 423/500; 423/579; 423/633
[58] Field of Search ............... 423/658, 419, 633, 481, 423/493, 579

[56] References Cited

U.S. PATENT DOCUMENTS

| | | | |
|---|---|---|---|
| 2,176,242 | 10/1939 | Bowes | 423/633 X |
| 3,842,164 | 10/1974 | Wentorf, Jr. | 423/579 |
| 3,929,980 | 12/1975 | Abraham et al. | 423/579 X |

OTHER PUBLICATIONS

C. A. Jacobson's, "Encyclopedia of Chem. Reactions", vol. 4, p. 53, Reinhold Pub. Corp.
J. W. Mellor's "A Comp. Treatise on Inorganic and Theo. Chem.", vol. 14, 1935, p. 41, Longmans, Green & Co., N. Y.

*Primary Examiner*—Edward Stern
*Attorney, Agent, or Firm*—Stevens, Davis, Miller & Mosher

[57] ABSTRACT

Hydrogen is produced by the thermal decomposition of water at temperatures of 1000° C or below by making use of iron salts and carbon dioxide, which are circulated in closed circuits in the reaction system. The only raw material to be supplied from an external source is water; all intermediates are circulated in the reaction system. A nuclear reactor may be used as a heat source for the reaction.

2 Claims, No Drawings

PROCESS FOR THE PRODUCTION OF HYDROGEN BY THE THERMAL DECOMPOSITION OF WATER

This invention relates to a process for the production of hydrogen. More particularly, the invention relates to a process for the production of hydrogen and oxygen by the thermal decomposition of water at temperatures generated by a nuclear reactor making use of iron (II) chloride and carbon dioxide as intermediates to be used repeatedly in the system of reaction.

Up to this time, most processes for the production of hydrogen have greatly been dependent upon fossil fuels, which are mostly comprised of hydrocarbons, both as a heat source and as raw material. Electrolysis of water for the same purpose also depends on fossil fuels since a major part of the electric energy available is supplied from heat power plants. Fossil fuels are, however, on the brink of running out, and continued dependence on fossil fuels is becoming impractical. On the other hand, processes for the production of hydrogen accompanied by the discharge of harmful effluents such as carbon dioxide, sulfur dioxide and the like will meet a difficulty in their practical application to industry, because environmental pollution by various industrial effluents is becoming a social problem of serious concern.

Prior art processes for the decomposition of water into hydrogen and oxygen which may be carried out at temperatures of 1000° C or below making use of a nuclear reactor as a heat source consuming water only as raw material to be fed include a process comprising a step of using calcium bromide and mercury compounds, which process is disclosed in French Pat. No. 2035558 filed in 1970. This process includes, however, the following defects: first, the practical application to large-scale plants seems to be dangerous in view of a possible emergency in which mercury compounds might be discharged by accident; and second, the selection of material for the reaction vessel is difficult, because in this process the system of reaction containing both water and halides is subjected to temperatures as high as around 800° C.

Thus, in recent years much attention has been directed toward the development of novel processes for the production of hydrogen which do not depend on fossil fuels and are free from pollution problems.

Accordingly, one object of the present invention is to provide a novel process for the production of hydrogen through the thermal decomposition of water without depending on fossil fuels.

Another object of the present invention is to provide a novel process for the production of hydrogen which is not accompanied by any industrial waste and therefore does not cause a pollution problem.

These and other objects of the present invention may be accomplished by carrying out the process of the present invention which can produce hydrogen and oxygen through the thermal decomposition of water, consuming water only without producing any industrial waste and which does not depend on fossil fuels either as a heat source or as a raw material.

The process of the present invention will be explained below in more detail especially referring to the reaction mechanism thereof.

In the process of the present invention, water is used as a raw material and is decomposed into hydrogen and oxygen through the process comprising main reaction system (A) involving five systems of reaction, that is: Reaction (1), Reaction (2), Reaction (3), Reaction (4) and Reaction (5); or the main reaction system (B) involving four systems of reaction, that is: Reaction (1), Reaction (2), Reaction (3a) a) and Reaction (4), with all intermediates formed in each main reaction system being used repeatedly in the same main reaction system from which hydrogen and oxygen are taken out as final products. Namely, the process of the present invention comprises a combination of four or five reactions referred to hereinabove as the "main reaction system (A)" or "main reaction system (B)".

The main reaction system (A) essentially consists of a combination of the following five reactions:

Reaction (1): $6\ FeCl_2 + 3\ CO_2 = 4\ FeCl_3 + Fe_2O_3 + 3\ CO$

Reaction (2): $3\ CO + 3\ H_2O = 3\ CO_2 + 3\ H_2$

Reaction (3): $Fe_2O_3 + 6\ HCl = 2\ FeCl_3 + 3\ H_2O$

Reaction (4): $6\ FeCl_3 = 6\ FeCl_2 + 3\ Cl_2$

Reaction (5): $3\ Cl_2 + 3\ H_2O = 6\ HCl + 3/2\ O_2$

In contrast, the main reaction system (B) essentially consists of a combination of Reaction (1), Reaction (2), Reaction (3a) and Reaction (4), wherein Reaction (3a) is as follows:

Reaction (3a): $Fe_2O_3 + 3\ Cl_2 = 2\ FeCl_3 + 3/2\ O_2$

To be exact, Reaction (1) is a summed-up form derived from a combination of the following three reactions:

Reaction (1a): $2\ FeCl_2 + 2\ CO_2 = 2\ FeO + 2\ CO + 2\ Cl_2$

Reaction (1b): $4\ FeCl_2 + 2\ Cl_2 = 4\ FeCl_3$

Reaction (1c): $2\ FeO + CO_2 = Fe_2O_3 + CO$

In the process of the present invention, as mentioned previously, all intermediates formed in the course of reactions can be fed back to the proper system of reaction in the main reaction system (A) or (B). For example, if a mixture of iron (III) oxide and iron (II) oxide is formed in accordance with Reaction (1d), which is as given below, during the prosecution of Reaction (1), the mixture is made to react with hydrogen chloride to convert it into iron (III)- and Iron (II) chloride in accordance with Reaction (3b) and Reaction (3c) before the iron chlorides thus obtained are recycled to the main reaction system (A) or (B).

Reaction (1d): $3\ FeO + CO_2 = Fe_3O_4 + CO$

Reaction (3b): $Fe_3O_4 + 8\ HCl = FeCl_2 + 2\ FeCl_3 + 4\ H_2O$

Reaction (3c): $Fe_3O_4 + 2\ HCl = FeCl_2 + Fe_2O_3 + H_2O$

In case all chlorine produced in the system of Reaction (1) in accordance with Reaction (1a) is not recovered in the system of Reaction (1b), a substantial amount of chlorine will appear in the gaseous products from the system of Reaction (1). In such case, chlorine must be removed from the gaseous products by means of cooling or the like and be fed back to the system of Reaction (5) in the main reaction system (A) or to the system of Reaction (3a) in the main reaction system (B).

Each system of reaction in the main reaction system (B) will be explained below in more detail.

In the system of Reaction (1), iron (II) chloride is heated to a temperature of 500° C or higher, which is a temperature to ensure no substantial formation of phosgene by the interaction of carbon monoxide and chlorine, and the heated iron (II) chloride is made to contact with carbon dioxide to give iron oxide the major part of which is iron (III) oxide; iron (III) chloride which is formed by a subsidiary system of Reaction (1b); and carbon monoxide.

The system of Reaction (2) involves the interaction of carbon monoxide and water vapor, this reaction being known by the name of "carbon monoxide conversion", to give hydrogen and carbon dioxide.

The system of Reaction (3) involves the interaction of (a) solid residue from Reaction (1) major part of which is iron (III) oxide; and (b) hydrogen chloride from Reaction (5) to given iron (III) chloride, which is subjected to the thermal decomposition in Reaction (4) to give iron (II) chloride and chlorine. The system of Reaction (5) involves the interaction of chlorine from Reaction (4) and water vapor to give hydrogen chloride and oxygen.

The construction of the main reaction system (B) is the same as that of the main reaction system (A) in the point that carbon monoxide obtained in Reaction (1) is made to react with water in Reaction (2), but is different in the point that iron (III) oxide, which is one of the reaction products in Reaction (1), is made to react with chlorine in Reaction (3a) to give iron (III) chloride and oxygen, followed by the thermal decomposition of iron (III) chloride into iron (II) chloride and chlorine in Reaction (4).

In the practice of the present invention, it is required to maintain the temperature of the system of Reaction (1) at or above 500° C to ensure the proceeding of Reaction (1) and at the same time to ensure no substantial formation of phosgene which is formed at lower temperatures by the interaction of chlorine and carbon monoxide produced in Reaction (1a).

Part of the chlorine produced in Reaction (1a) reacts with iron (II) chloride in Reaction (1b) to give iron (III) chloride which immediately evaporates because of its low boiling point of 317° C. The vapor of iron (III) chloride moves to the lower temperature region and condenses there to produce a deposit on the wall, thus being separated from unreacted carbon dioxide and carbon monoxide. Iron (II) chloride obtained as a reaction product in Reaction (1a) is, if the reaction temperature is high, oxidized by carbon dioxide according to Reaction (1c) to give iron (III) oxide. Since the system of Reaction (1) is free from hydrogen compounds and water, the problem of the corrosion of reactors is reduced, which one often encounters in case chlorides are treated in the presence of water at high temperatures, and therefore the selection of materials for the construction of reactors is made easy. This is one of the great advantages of the present invention as compared with the process of said French Pat. No. 2,035,558 involving high temperature hydrolysis of calcium bromide as an essential step.

Reaction (2) is a conventional one known by the name of "carbon monoxide conversion". This reaction is, for example, conveniently carried out by first contacting a mixture of carbon monoxide and water vapor with Fe-Cr catalyst at temperatures within the range of from 350° C through 500° C to make the major parts of each component react with each other followed by further contacting the reaction mixture with Cu-Zn catalyst for the completion of reaction.

Reaction (3) is also conventional and is a process for giving iron (III) chloride or an aqueous solution thereof by the interaction of iron (III) oxide and an aqueous solution of hydrogen chloride or gaseous hydrogen chloride. When an aqueous solution is used, oxygen is preferably removed from the solution in advance. If iron (II) oxide or the mixed iron (II) oxide-iron (III) oxide is present as a contaminant in the system of Reaction (3), the formation of iron (II) chloride takes place. This iron (II) chloride can be converted to iron (III) chloride by the chlorination in accordance with Reaction (1b). For example, chlorine gas may be blown into the solution if the reaction is carried out in the solution. Alternatively, iron (II) chloride is made to absorb chlorine at temperatures below 300° C in case iron (II) chloride is formed in the state of anhydrous solid.

Reaction (3a) involves the interaction of iron (III) oxide and chlorine to give iron (III) chloride and oxygen. The reaction is carried out at or above 500° C and iron (III) chloride is obtained in the form of vapor. The vapor can be condensed to solid by taking it out of the reactor and cooling to 300° C or lower. By this, the vapor can be easily separated from oxygen.

Reaction (4) involves the thermal decomposition of iron (III) chloride into iron (II) chloride and chlorine. This reaction is carried out at temperatures in a range of from 300° C to 800° C. The reaction proceeds even if temperatures are below 300° C although the rate of reaction is low and the chemical equilibrium of the decomposition reaction is unfavorable from a practical viewpoint. This reaction is in fact concerned with the decomposition of the vapor of iron (III) chloride, and therefore the following Reaction (4a) will more precisely represent the actual reaction:

Reaction (4a): $3\ Fe_2Cl_6 = 6\ FeCl_2 + 3\ Cl_2$

The degree of decomposition is 10% at 400° C and about 50% at 800° C. The reaction proceeds without trouble at temperatures higher than 800° C, but there is no substantial increase in the degree of decomposition. In this reaction, when iron (III) chloride is fed to a reactor at a temperature above its melting point of 300° C and the temperature of reaction is maintained at or below 672° C, iron (II) chloride is given in the form of solid; if the temperature of reaction is above 672° C, it is given in the form of liquid.

Reaction (5) is a reverse reaction of a reaction well known in the art by the name of "Deacon Reaction" which is directed to the production of chlorine and water by the interaction of hydrogen chloride and oxygen. The reverse reaction, or Reaction (5), proceeds at or above 600° C.

As explained above, through the process of the present invention which comprises the main reaction system (A) including the systems of Reaction (1), Reaction (2), Reaction (3), Reaction (4) and Reaction (5), or alternatively comprises the main reaction system (B) including the systems of Reaction (1), Reaction (2), Reaction (3a) and Reaction (4), hydrogen and oxygen are produced at or below 1000° C consuming only water which is externally supplied as a raw material. In the process of the present invention, all intermediates which appear in the course of reaction such as iron (II) chloride may be used repeatedly, and no waste material is discharged out of the reaction system. All reactions but Reaction (1) and Reaction (1a) are conventional, but the specific combination of these reactions in accordance with the present invention brings about unexpected advantages which can not be gained by each separate reaction or any other combinations in part.

The invention will be further illustrated by the following examples.

EXAMPLE 1

This example is concerned with the main reaction system (A). Reaction (1): Anhydrous iron (II) chloride in an amount of 6.34 g was placed in a vertical-type quartz reaction tube which was placed in an electric furnace heated to 800° C. Through a gas introduction conduit made of quartz the nose of which extends towards the bottom of the reaction tube in the center region, carbon dioxide was bubbled into the molten iron (II) chloride at a flow rate of 15 ml/min (throughout the examples, the volume of gas is calculated in terms of N.T.P., i.e. at 0° C and atmospheric pressure). The gas flowing out of the upper part of the reaction tube was introduced into a column of a gas chromatograph filled with Molecular Sieve 5A from time to time to determine the concentration of carbon monoxide; it was determined to be 1.8% in average. The same gas was subjected to further analysis by introducing it into a column of Chromosorb carrying Fluorolube: the concentration of chlorine was determined to be 0.15% in average. The amount of chlorine obtained through the reaction for 5 hours was 6.8 ml in total. Then the gas was passed through a trap cooled with liquid nitrogen, in which trap all chlorine and unreacted carbon dioxide was condensed and separated from carbon monoxide which was delivered to the system of Reaction (2).

After five hours run of Reaction (2), all the contents of the reaction tube, including scraped-off deposit from its inner wall at the low temperature zone were collected: the remaining deposit on the wall being throughly removed by the application of 100 ml of ethanol thereto. The solution was filtered to separate 200 mg of the undissolved residue from the filtrate. The filtrate was subjected to vacuum drying before it was placed for further drying treatment in a stream of dry hydrogen chloride at a temperature of 200° C. As a result, 6.18 g of a mixture of iron (III) chloride and unreacted iron (II) chloride was obtained. Part of said mixture was dissolved in water from which air had previously been expelled. The solution thus obtained was divided into two equal portions. To one of said portions directly, and to the other portion after the addition thereto of 1% aqueous solution of hydroquinone for reduction treatment, 0.5% aqueous solution of o-phenanthroline was added respectively, and then each solution was subjected to the measurement of absorbency at a wavelength of 508 m$\mu$ to determine the concentration of iron (II), or ferrous, ion. The ferrous ion content of the reduced solution was 90.7% that of the untreated solution. This experimental result shows that 5.46 g of iron (II) chloride was recovered unreacted out of 6.18 g of iron (II) chloride used as a raw material, giving 0.72 g of iron (III) chloride as a reaction product.

Reaction (2): A mixture consisting of 10 parts of iron (III) nitrate nonahydrate and 1 part of chromium (III) nitrate nonahydrate was dissolved in water and an aqueous solution of ammonium was added thereto to give a precipitate. The precipitate was separated by filtration and was dried before it was calcinated at 650° C to give a solid catalyst comprising a major amount of iron (III) oxide and a minor amount of chromium (III) oxide. The solid catalyst particles (10 g) were placed in a quartz tube, to which a joined stream comprising the stream of carbon monoxide from Reaction (1) and the stream of a mixture of water vapor and nitrogen was introduced. The carbon monoxide content of the joined stream was 10%, the water vapor content thereof 15% and the flow rate in total was 2.7 ml/min. By passing the joined stream through a bed of the catalyst at an elevated temperature of 400° C, unreacted water vapor was separated in condensation and a stream comprising 4.6% hydrogen, 4.5% carbon dioxide and 6.7% unreacted carbon monoxide was obtained. This reaction was continued for 5 hours with Reaction (1) in series to give 48.0 ml of unreacted carbon monoxide, 32.4 ml of carbon dioxide and 33.1 ml of hydrogen. Water in quantity of 98.8 mg was supplied to this reaction, 26.5 mg out of which was consumed by the reaction.

Reaction 3: 200 mg of the residue obtained by the filtration of the ethanol solution from the system of Reaction (1) was dissolved in hydrochloric acid to give a solution of iron (III) chloride. On the other hand, the mixture obtained in Reaction (1) comprising iron (III) chloride and iron (II) chloride was placed in a quartz reaction tube followed by evacuation of the tube before heating it to a temperature of 350° C, which is a temperature to ensure that the decomposition of iron (III) chloride in accordance with Reaction (4) does not occur. By this heat treatment, iron (III) chloride was sublimated. The dark red deposit of iron (III) chloride appeared on the wall after sublimation was scraped off the inner wall of the reaction tube. The collection of iron (III) chloride was dissolved in water and the solution was joined with the solution of iron (III) chloride from Reaction (3). After reduction treatment with hydroquinone, the solution was subjected to the measurement of the absorbence in the state of slight acidity using o-phenanthroline as mentioned previously: after the measurements, the quantity of iron (II) was determined to be 5.65 m mole and that of iron (III) chloride 917 mg.

Reaction (4): Anhydrous iron (III) chloride was placed in a stream of hydrogen chloride to be dried by heat and 917 mg of the dried sample was placed in a quartz reaction tube of 410 ml capacity before the reaction tube was evacuated, followed by heating the bottom part thereof to 600° C for 2 hours. Pale yellowish green iron (II) chloride was left at the bottom of the reaction tube and the deposit of reddish brown iron (III) chloride resulting from sublimation was observed on the wall at the lower temperature region. The pressure of chlorine inside the reaction tube after the reaction was 12.2 mmHg at 25° C, which corresponds to 6.0 ml at N.T.P. (normal temperature and pressure). The chlorine was discharged from the tube and the content of the reaction tube comprising a mixture of iron (II) chloride and iron (III) chloride was subjected to quantitative analysis in the same manner as in Reaction (1): 9.5% of 917 mg iron (III) chloride was decomposed to give 68.0 mg iron (II) chloride.

Reaction 5: Chlorine discharged from the reaction tube in Reaction (4) was admixed with the gaseous mixture of chlorine and carbon dioxide obtained in Reaction (1). One tenth the quantity of the final mixture was taken to put into a quartz vessel containing 18 mg of water and was heated at 850° C for 15 hours. The analysis of the gas mixture showed that concentrations of hydrogen chloride, oxygen, and unreacted chloride were 0.24%, 0.06% and 0.16% respectively. This means that if the total amount of said final mixture is subjected to the reaction, that is, 12.8 ml of chlorine and 180 mg of water are used, 5.4 ml of chlorine and 4.3 mg of water will react with each other to provide 10.8 ml of hydrogen chloride and 2.7 ml of oxygen.

As is evident from the above description, 33.1 ml of hydrogen was produced in Reaction (2). However, 48.0 ml of unreacted carbon monoxide still remained in the system of reaction. This unreacted carbon monoxide still can react with water to give an equivalent amount of hydrogen. Thus, theoretically, 81.1 ml of hydrogen can be obtained in total upon completion of Reaction (2).

In reaction (5), 2.7 ml of oxygen was produced, but 7.4 ml of chlorine remained unreacted. Since this unreacted chlorine has a potential of producing half an equivalent amount of oxygen, 6.4 ml of oxygen can be obtained in total upon completion of Reaction (5).

Referring to the quantities of these gases, 6.4 ml of chlorine comes from the system of Reaction (1), which corresponds to 3.4 ml of oxygen. Since the rate of decomposition of iron (III) chloride in accordance with Reaction (4) was 9.5% per one trial, total amount of oxygen to be produced upon completion of Reaction (5) in case the decomposition of iron (III) chloride is completed by repeated decomposition trials is calculated as follows:

The amount of oxygen coming from Reaction (4) is: 6.4 − 3.4 = 3.0 ml;

The amount of oxygen to be produced upon completion of Reaction (5) is: 3.0 ÷ 0.095 = 31.6 ml;

The amount of oxygen coming from Reaction (1) is: 3.4 ml;

Total amount of oxygen is: 31.6 + 3.4 = 35.0 ml

On the other hand, the amounts of water consumed as a raw material in Reaction (2) and Reaction (5) were 26.5 mg and 4.3 mg respectively. In Reaction (2), however, 48 ml of carbon monoxide, which could react with an equivalent amount of water, remained unreacted. Thus, 38.6 mg of water is to be consumed upon completion of the reaction. Thus, in Reaction (2): 26.5 + 38.6 = 65.1 mg of water will be consumed in total.

Referring now to Reaction (5), in addition to 4.3 mg of water actually consumed in the reaction, 5.9 mg of water corresponding to 7.4 ml of unreacted chlorine will be consumed upon completion of the reaction. Thus, 10.2 mg of water will be consumed in total. This total amount of water includes 5.5 mg of water which was consumed in the reaction with 68 ml of chlorine coming from Reaction (1). Thus, the difference: 10.2 − 5.5 = 4.7 mg is the amount of water to be consumed in the reaction with chlorine coming from Reaction (4). Since the conversion of Reaction (4) was 9.5%, water to be consumed upon completion of Reaction (4) and Reaction (5) is: 4.7 ÷ 0.095 = 49.5 mg.

On the other hand, when 200 mg of residue undissolved in ethanol mainly comprising iron (III) oxide was dissolved in hydrochloric acid in Reaction (3), the amount of water produced in accordance with Reaction (3) was 67.7 mg. Thus, the amount of water consumed in this example is given by subtracting 67.7 mg of water produced in Reaction (3) from the sum of (a) 65.1 mg of water to react with carbon monoxide in Reaction (2); (b) 5.5 mg of water to react in Reaction (5) with chlorine coming from Reaction (1); and (c) 49.5 mg of water to react with chlorine coming from Reaction (4) in Reaction (5) to give 52.4 mg. In short, by consuming 52.4 mg of water, 81.1 ml of hydrogen and 35.0 ml of oxygen were produced.

In Reaction (1), 6.34 g of iron (II) chloride was subjected to the reaction, 5.46 g out of which was recovered unreacted. Since 917 mg of iron (III) was obtained in total through Reaction (1) and Reaction (3), 716 mg of iron (II) chloride is expected to be gained in Reaction (4). After all, referring to iron (II) chloride, 6.34 g of iron (II) chloride was used; 5.46 + 0.72 = 6.18 g was recovered (97.5% recovery). It shows that iron (II) chloride can be made to circulate in the main reaction system repeatedly.

EXAMPLE 2

This example is directed to the main reaction system (B).

Reaction (1) and Reaction (2) were carried out in the same way as in Example 1.

Reaction (3a) was carried out in the following way:

200 mg of residue undissolved in ethanol mainly comprising iron (III) chloride obtained in Reaction (1) was placed in a quartz reactor, through which a stream of gas mixture comprising helium and 10% of chlorine was passed at a flow rate of 10 ml/min, while the reaction system was heated to about 400° C, a temperature which ensures that neither the condensation of iron (III) chloride nor the decomposition thereof into iron (II) chloride will occur. After 2 hours run of this reaction, iron (III) chloride which was condensed on the inner wall of the reactor in the low temperature region was collected by dissolving it in water. The solution was subjected to the measurement of absorbence in the presence of o-phenanthroline in the same way as in Example 1. It was found that 2.40 m mole iron (II), or 380 mg iron (III) chloride, was recovered.

Reaction (4) was carried out in the same way as in Example 1 except that 1109 mg of iron (III) chloride, which was the total of 720 mg from Reaction (1) in Example 1 and 389 mg from Reaction (3a), was used. Through this process, hydrogen and oxygen were produced conveniently by consuming water only.

What we claim is:

1. A process for the production of hydrogen by the decomposition of water at a temperature not greater than 1000° C, comprising an interrelated combination of the following five reactions:
    1. reacting iron (II) chloride and carbon dioxide at a temperature of 500° C or greater thereby producing (a) iron oxides mainly comprising iron (III) oxide, (b) iron (III) chloride, and (c) carbon monoxide,
    2. reacting said carbon monoxide (c) with water vapor thereby producing carbon dioxide and hydrogen;
    3. reacting said iron (III) oxide produced in reaction (1) with hydrogen chloride produced in reaction (5) below, thereby producing iron (III) chloride and water;
    4. thermally decomposing said iron (III) chloride, thereby producing iron (II) chloride which is recycled into reaction (1) above, and chlorine; and
    5. reacting said chlorine produced in reaction (4) with water vapor thereby producing hydrogen chloride which is recycled into reaction (3) above, and oxygen;
    the hydrogen produced in reaction (2) above, being the primary product of said process.

2. A process of claim 1 in which the products of each reaction, except hydrogen and oxygen, are recycled in the process.

* * * * *